(12) United States Patent
York

(10) Patent No.: US 6,807,076 B1
(45) Date of Patent: Oct. 19, 2004

(54) MULTIPLE MODE UNIVERSAL POWER SOURCE

(75) Inventor: Douglas S. York, Langley, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/452,671

(22) Filed: May 30, 2003

(51) Int. Cl.⁷ .............................................. H02M 7/00
(52) U.S. Cl. ...................................................... 363/124
(58) Field of Search ........................... 363/34, 71, 123, 363/124, 157, 159; 307/82, 83

(56) References Cited

U.S. PATENT DOCUMENTS

| | | | |
|---|---|---|---|
| 3,718,854 A | | 2/1973 | Spyrou et al. |
| 4,706,174 A | | 11/1987 | Schutten et al. |
| 4,706,175 A | | 11/1987 | Schutten et al. |
| 4,706,183 A | | 11/1987 | Schutten et al. |
| 4,706,184 A | | 11/1987 | Schutten et al. |
| 5,615,095 A | * | 3/1997 | Reynolds et al. ......... 363/56.02 |
| 5,710,696 A | * | 1/1998 | Reynolds et al. ............. 363/37 |
| 6,275,405 B1 | | 8/2001 | Pernyeszi |
| 6,320,775 B1 | * | 11/2001 | Ito et al. ...................... 363/132 |
| 6,466,468 B1 | * | 10/2002 | York ............................. 363/65 |
| 6,621,721 B2 | * | 9/2003 | York ............................. 363/65 |
| 6,690,588 B2 | * | 2/2004 | York ............................. 363/65 |

* cited by examiner

*Primary Examiner*—Adolf Berhane
(74) *Attorney, Agent, or Firm*—Black Lowe & Graham PLLC

(57) ABSTRACT

A direct conversion programmable power controller receiving polyphase input power at an input power frequency and with a polarity is provided. The controller includes a primary chopper for reversing each phase of electrical power according to a reference frequency that is substantially higher than frequency of the electrical power. Each primary chopper has a power input, a signal input, and an output. The power input is electrically connected in wye-connection to each phase of power. A transformer for each phase of power has primary and secondary terminals and is electrically connected by its primary terminals to the output of the primary chopper. A secondary chopper for each phase of power has an input connected electrically to the secondary terminals of the transformer. The secondary chopper is configured to reverse each phase of electrical power according to the reference frequency and to shift phases of electrical power according to a reference signal.

32 Claims, 4 Drawing Sheets

MULTIPLE MODE UNIVERSAL POWER SOURCE

FIELD OF THE INVENTION

This invention relates generally to prime mover systems and, more specifically, to power generation.

BACKGROUND OF THE INVENTION

In most power generation applications, synchronous motors are driven to generate AC power. When so used, the frequency of AC power output is dependent upon the process used to apply torque to the synchronous motor. Constant torque at standardized values rarely exists in nature to precisely turn a synchronous machine. The rotational rate or angular velocity varies greatly. Because angular velocity is proportionate to the resulting frequency and voltage of AC power, where the angular velocity of the torque source is variable, the frequency and voltage of the resulting power is variable.

Randomly variable frequency AC power is not very useful. It is impossible to synchronize such power with a power supply network in a commercially practical manner. Such power cannot drive most applications designed for 60 Hz. line supply voltages. Few applications can tolerate such frequency variability.

To overcome the frequency variability in power generation, the solutions have been of two types: input and output solutions. Input solutions are mechanical and govern the power transfer to the synchronous machine. Output solutions condition electrical power garnered from the synchronous machine.

Traditionally, design constraints on power processing have required selection of components based upon the peak power to flow through those components rather than to design around the mean as in DC power systems. Periodically recurring peaks in the voltage and current waveforms for each phase develop recurrent power transfer well above the mean. Nonetheless, the power drawn from such a system as an aggregate is constant. For instance, the total power drawn from a balanced three-phase source by a balanced resistive load is constant. That is $$P_t(t) = (V^2/R) \, [sin^2 \omega t + sin^2(\omega t + \phi) + sin^2(\omega t + 2\phi)] = 1.5 \, (V^2/R) \quad (1)$$

where $P_t$=time value of power;
V=peak line voltage;
R=load resistance (per phase);
ω=source frequency; and
ø=2π/3.

This fact is exploited in a cycloconverter at discrete frequencies. Small fluctuations in frequency are passed to the output. This need not be the case. The power transferred from source to load is not a function of time. The transfer of power can be accomplished without storing energy within the processor between input voltage cycles.

The traditional input solution to electrical power generation in applications such as aircraft has been through the Constant Speed Drive (CSD) coupled to a generator providing, for example, 115 VAC with three-phase power at a constant 400 Hz. In more recent times this arrangement has combined the CSD and generator into an Integrated Drive Unit, or IDU. With a constant frequency power output this has been a creditable solution, albeit expensive to buy and to maintain.

More recently, the output solution has been the Variable Frequency (VF) and cycloconverter systems. Cheaper of these two options, VF presents a load with power such as 115 VAC, three-phase power but only has a distribution capability at a frequency proportional to the engine speed. For a turbofan engine, for instance, this is usually 2:1. However, because of the wide range of frequency variation, power conditioning would be essential for almost all cases and, when added to the procurement, the additional cost of attendant motor controllers becomes prohibitively expensive.

In recent years, power has been generated with a Variable Speed Constant Frequency (VSCF) cycloconverter. A cycloconverter is a power electronics device designed to provide a variable voltage, constant frequency AC drive in a one stage operation, suitable for supply to an AC motor. These devices work by generating very high frequency three-phase power then selectively drawing voltages from the peaks of the three phases in a manner to construct rough approximations of lower frequency waveforms.

While a VSCF system unit (cycloconverter) does have the ability to produce AC and DC simultaneously, it does not produce clean waveforms. Voltage regulation is accomplished by a series of magnetic amplifiers, transformers, and bridge rectifiers. The VSCF drive uses a simple drive system and lets the alternator produce an electrical supply that is not well-controlled, which is then shaped by a solid-state electrical unit. Nonetheless, the resulting waveform includes several harmonics that impart an imaginary component to the power and may interfere with the function of the load.

Still another means of generating constant frequency power from a variable source of torque is based upon converting and rectifying power to DC before inverting the DC power to AC power such as 60 Hz. line voltage. This approach requires a converter that can sink current of opposite polarity to the output voltage. However, most converters cannot accommodate a non-unity power factor load. Additionally, for a given power level, in a single-phase rectifier, the current pulses that make up a ripple may be four to five times as large as the peak of the current waveform for an equivalent unity power factor load. Such current requires much larger conductors to minimize resistive losses. In polyphase rectifiers, the current peaks are not as large since smaller peaks occur more frequently, but the power quality is not as good because of large current transitions.

Cycloconverters and devices for converting and inverting power use, such as transformer rectifier units that operate at line frequency, chop power at low frequencies, thereby creating low frequency fundamental sinusoids. As a result, large and heavy transformers and large capacitors are typically used to store energy for smoothing peaks and filling valleys in the waveform. Introduction of such elements often adds reactive factors that affect the power factor. In such configurations, the reactance causes the current to either "lead" the voltage or to "lag" the voltage. Like the input solution, power conditioning is necessary for power-factor correction. Often this includes use of synchronous motors spinning in "no load" states. All of these solutions prove to be costly. The need for constant frequency power has justified these solutions.

U.S. Pat. No. 6,466,468 issued to Douglas York on Oct. 15, 2002 presented a novel means of producing variable frequency power without rectifying that power to direct current. The teaching of the York patent, incorporated by this reference, is to chop power to a frequency significantly above the range of frequencies used to drive the motor for the application and, by phase shifting the chopped power, producing a power wave form at a desired frequency that represents a product of the input power at the input frequency multiplied by a reference sinusoid at an appropriate frequency. This method has proven to be inherently more efficient then rectifying to direct current.

When used to power a discrete system, however, the system taught in the York patent entails a one-to-one correspondence between the primary chopping phase and the secondary chopping phase. This one-to-one correspondence prevents the use of a single chopper with several secondary choppers for industrial applications that use more than a single output power type. There is, therefore, an unmet need in the art for an efficient means of conditioning the output of a generator allowing a one-to-many relationship between the primary chopper phase and the secondary chopper phases.

SUMMARY OF THE INVENTION

A direct conversion programmable power controller receiving polyphase input power at an input power frequency and with a polarity is provided. An exemplary embodiment of the controller includes a primary chopper for reversing each phase of electrical power according to a reference frequency that is substantially higher than frequency of the electrical power. Each primary chopper has a power input, a signal input, and an output. The power input is electrically connected in wye-connection to each phase of power. A transformer for each phase of power has primary and secondary terminals and is electrically connected by its primary terminals to the output of the primary chopper. A secondary chopper for each phase of power has an input electrically connected to the secondary terminals of the transformer. The secondary chopper is configured to reverse each phase of electrical power according to the reference frequency and shifts phases of electrical power according to a reference signal.

The invention modulates the received input power by rapidly reversing its polarity at a frequency significantly higher then the frequency of the input power. Because the modulating frequency is significantly higher than the input frequency, the resulting waveform is a substantially square wave over any of several wavelengths of the modulating waveform. Because the resulting modulated waveform integrates to zero over a period, use of the substantially square wave avoids saturation of the isolation transformer. Additionally, because of the suitably high frequency, the transformers used for isolation can be much smaller than those used for conveying power at a grid frequency from 50 to 60 Hz.

The invention also allows more then one secondary chopper to be connected to the output of a single primary chopper, thereby allowing distribution of the output of the primary chopper to be distributed on a power bus for secondary chopping at the application.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, a direct conversion programmable power controller receiving polyphase input power at an input power frequency and with a polarity is provided. The controller includes a primary chopper for reversing each phase of electrical power according to a reference frequency that is substantially higher than frequency of the electrical power. Each primary chopper has a power input, a signal input, and an output. The power input is electrically connected in wye-connection to each phase of power. A transformer for each phase of power has primary and secondary terminals and is electrically connected by its primary terminals to the output of the primary chopper. A secondary chopper for each phase of power is configured to reverse each phase of electrical power according to the reference frequency and shifts phases of electrical power according to a reference signal. The secondary chopper has an input connected electrically to the secondary terminals of the transformer.

Figure 1:
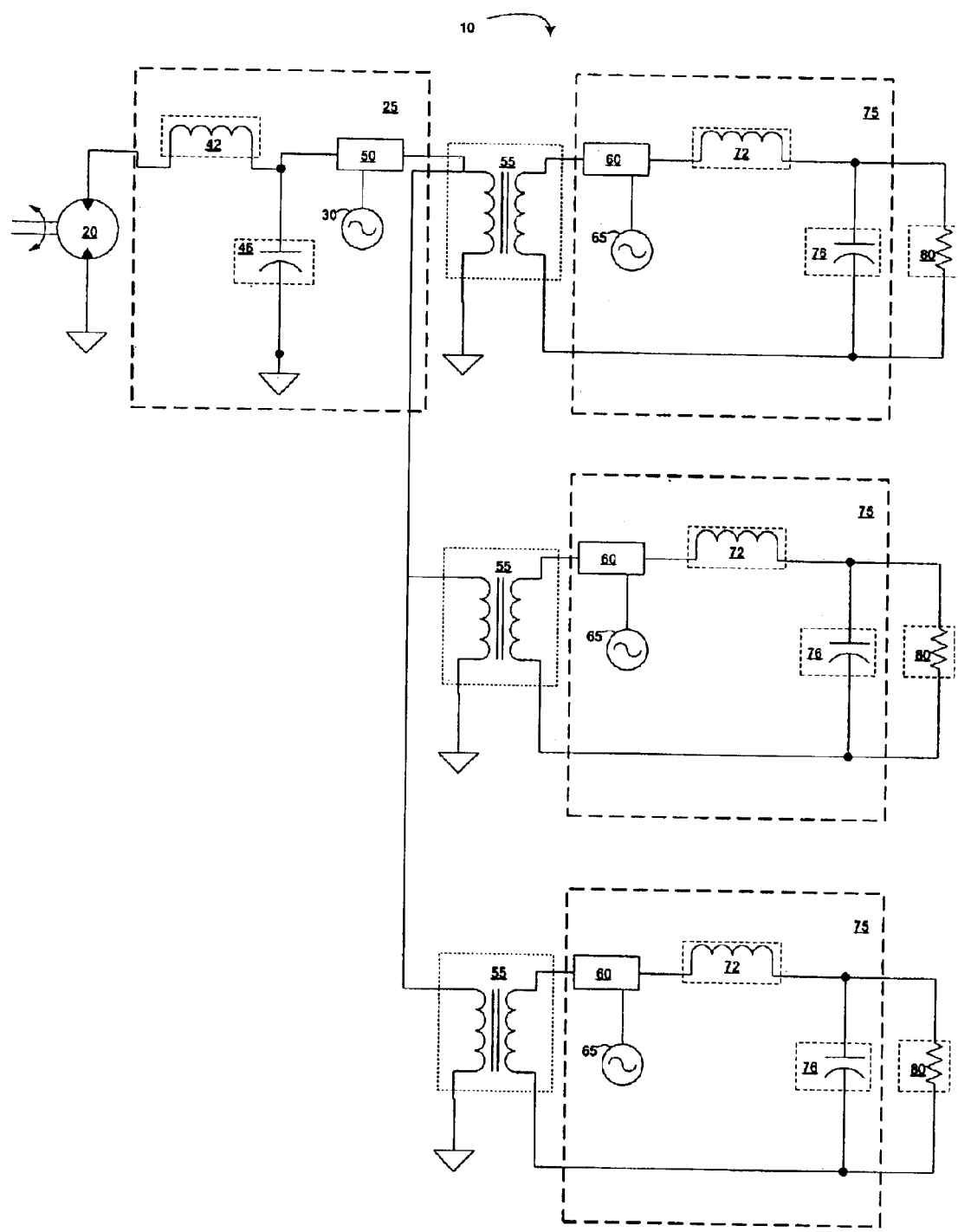
FIG. 1 is a schematic diagram of a single-phase of a three-phase controller.

FIG. 1 is a schematic diagram of a single-phase circuit of a three-phase controller 10. Each phase circuit of the power controller 10 includes three principal elements: a primary chopper 25, an isolation transformer 55, and a secondary chopper 75. A clock oscillator 30 and a variable oscillator 65 provide timing and modulation signals to the primary chopper 25 and the secondary chopper 75.

Advantageously, it is not necessary for a one-to-one correspondence between the number of primary choppers 25 and of secondary choppers 75 to exist. As illustrated in FIG. 1, a presently preferred embodiment allows for a plurality of secondary choppers 75 that are connected to a single primary chopper 25. Additionally, while a presently preferred embodiment allows for a transformer 55 corresponding to each secondary chopper 75, those skilled in the art will readily appreciate that a single transformer 55 might be connected to a single primary chopper 25 that is, in turn, connected to a plurality of secondary choppers 75. Alternately, a single primary chopper 25 may be connected to a single transformer 55 with a plurality of secondary windings, with each winding corresponding to one of a plurality of single secondary choppers 75.

The primary chopper 25 and the secondary chopper 75 share a substantial symmetry in configuration and function. Within the primary chopper 25 are a primary filter inductor 42, a primary filter capacitor 46, and a primary gating array 50. The primary filter inductor 42 and the primary filter capacitor 46 remove ripple frequencies from the line voltage. The primary filter inductor 42 and the primary filter capacitor 46 are not necessary for the successful operation of the controller 12 but are selected to suitably condition the power used for better operation of the inductive elements of the system, such as the controlled generator 20.

The primary gating array 50 is any suitable array that will periodically reverse the filtered power based upon a clock signal. One such gating array is taught in U.S. Pat. No. 6,466,468 issued to Douglas York on Oct. 15, 2002 and incorporated by this reference. However, other suitable methods are also known to those skilled in the art. The minimal function desired is to periodically reverse power fed to the gate according to the clock signal fed from the clock oscillator 30.

The transformer 55 isolates the primary chopper 25 from the secondary chopper 75. The secondary gating array 60 effects a "multiplication of sines" more completely described in the discussion of FIG. 3 below thereby enabling frequency variability. The secondary chopper 75 reverses polarity in much the same manner as the primary chopper 25. To the extent that the primary chopper 25 and the secondary chopper 75 differ, it is in the timing of the reversing of the provided power. The secondary chopper 75 is out of phase with the primary chopper 25 by an amount equal to around one quarter of a wavelength (presuming a sine-like wave with two zero-crossings in one wavelength) plus the instantaneous value of a modulating waveform received from the variable oscillator 65.

Like the primary chopper 25, the secondary chopper 75 includes low-pass filtering elements: a secondary filtering inductor 72 and a secondary filtering capacitor 76. The values for these filtering elements are selected to suitably suppress upper harmonics in the circuit that might generate RF interference in the ambient space in proximity to the secondary chopper 75, as well as to condition the power suitably for a particular application. In the case of an AC motor, the filtering removes upper harmonics from the output of the secondary gating array 60, where such harmonics generate eddy currents in the cores of windings in the motor thereby heating the motor but not adding to output torque.

Figure 2:
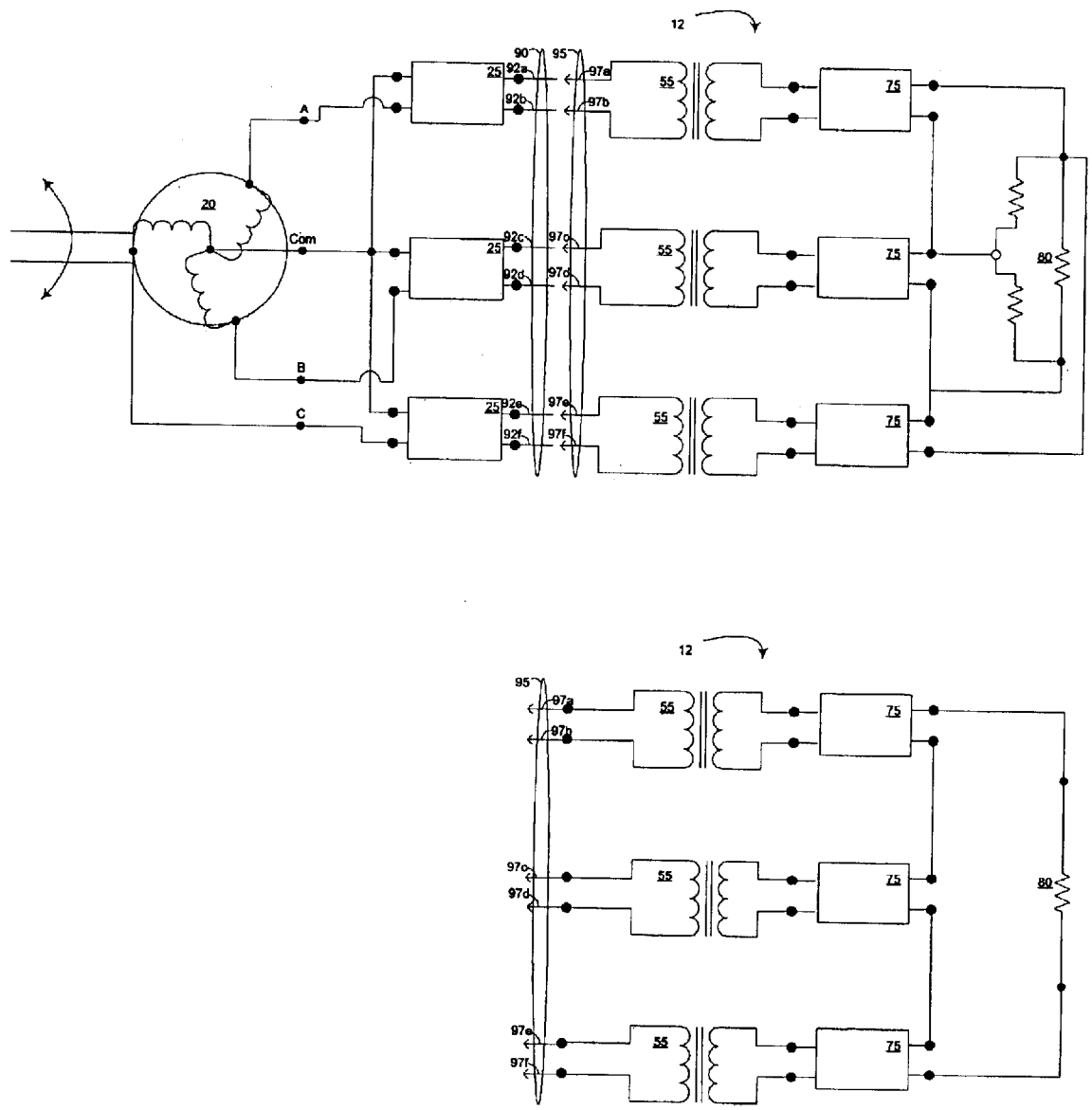
FIG. 2 is a general schematic diagram of the three-phase controller.

Referring to FIG. 2, a presently preferred embodiment is further described. In many applications, power is generated within a contained system, such as a vehicle like an airplane, automobile, or vessel. It is suitably advantageous to draw a motivating torque from a prime mover and distributing power throughout the system for use by several subsystems. Rather than to fix the rotational frequency of the prime mover or of a driven shaft from the prime mover thereby limiting its utility for locomotion, the varying frequency power from the generator 20 fed to the primary chopper 25 is chopped at the primary chopper 25 according to the constant frequency of the output from the oscillator 30 (FIG. 1). This chopper power is fed on a power bus 90 throughout the system. At various points where power is needed, a pickup 95 completes a connection with the power bus 90 thereby conducting the chopped power to one of a plurality of pairs 12 of transformers 55 and secondary chopper 75. The transformer 55 receiving conducted chopped power and the secondary chopper 75 are suitably configured to again chop the chopped power to develop power at voltages suitable for such loads 80 than the power is intended to feed; e.g. three-phase; single-phase; or direct current. The pick-up 95 might be configured as a male plug to insert into a female jack that is electrically connected to the bus 90 to further ease configuration of the bus 90 to fit into the system.

Figure 3:
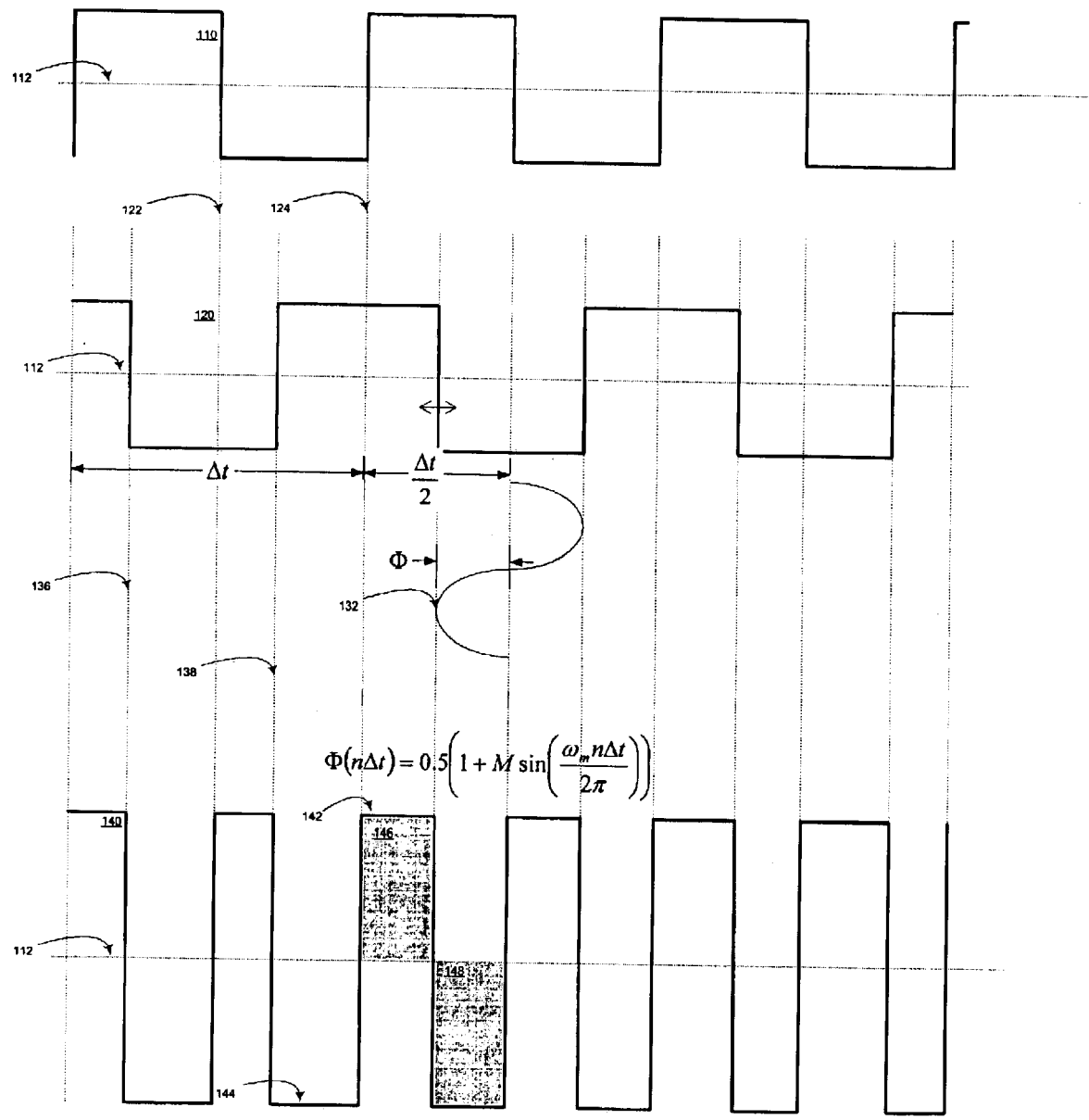
FIG. 3 is an exemplary wave-tracing diagram that shows the interplay of primary and secondary choppers on a theoretical direct current input.

Referring to FIGS. 1 and 3, an exemplary wave-tracing diagram shows the interplay of the primary chopper 25 and secondary chopper 75 on a theoretical direct current input. While the present invention is based upon geometric equations set forth in U.S. Pat. No. 6,466,468 issued to Douglas York on Oct. 15, 2002, the chopping strategy used to effect the geometric equations is distinct. Rather than the chopping strategy taught in (he York '468 patent where the phase and frequency of each of the choppers was determined by the desired power output frequency, the present invention frees the primary chopper 25 from dependence upon the desired output frequency.

In the present invention, the primary gating array 50 periodically reverses power according to the primary chopper signal trace 110. The primary signal trace 110 is portrayed as a square-wave oscillating about the zero-voltage axis 112 from a positive voltage value to a negative voltage value of equal magnitude. Because the primary gating array 50 suitably is only a switching array and has no amplifying component, the magnitude of the portrayed square wave is dependant solely upon the input power. Thus, for illustrative purposes, the square-wave oscillates from an arbitrary positive constant to the same arbitrary constant on the negative side showing the transmission of the input power and then its inverse.

The resulting primary chopper signal trace 110 demonstrates the square-wave character of the resulting power signal. Because the chopping clock signal comes from the clock oscillator 30, and the frequency of the clock oscillator signal is selected to be significantly higher than that of the input power, from one cycle to the next there is very little deviation from a true square wave. The square-wave nature of the power output from the primary gating array 50 allows the power output to pass through the transformer 55 without saturating the core with flux, as might happen when the wave is unbalanced (meaning it has a D.C. component).

The square-wave input into the transformer 55 may be said to induce a square-wave output identical to the primary chopper trace 110, thereby ignoring any inductive effects that might remove high frequency harmonics from the output wave. These inductive effects are not significant to the operation of the invention. To achieve the variability of frequency taught in the York '468 patent incorporated above, the present invention phase shifts the primary chopper trace 110 according to the equation:

$$\Phi(n\Delta t) = 0.5\left(1 + M \sin\left(\frac{\omega_m n \Delta t}{2\pi}\right)\right) \quad (1)$$

where $\Phi(n\Delta t)$ is the phase shift expressed as a function of time (specifically a fraction of one interval $\Delta t$), and time being expressed as n intervals of length $\Delta t$ (the period of one wave received from the clock oscillator 30). Because the modulating coefficient M is a real number whose value is bounded by 0 and 1 and represents the relation between the magnitude of the output power to the magnitude of the input power (recalling that there is no amplifying function in the primary gating array 50), the output of the $\Phi(n\Delta t)$ function is bounded by 0 and 1.

Thus, to phase shift the output of the clock oscillator 30 in accordance with Equation (1), the primary chopper trace 110 is phase shifted by one half of one cycle $$\frac{\Delta t}{2},$$

(representing the 0.5×1 portion of Equation (1) plus one-half of the product of M sin $$\left(\frac{\omega_m n \Delta t}{2\pi}\right),$$

where $\omega_m$ is a modulating frequency configured to produce a desired output frequency. The modulating frequency $\omega_m$ is expressed in radians per second and is divided by $2\pi$ to reduce the expression to one of revolutions per second. A secondary gating trace 120 represents the resulting wave. Thus, where the primary gating array 50 reverses polarity of the input power at times 122 on the fall and 124 on the rise of the primary gating trace 110, the secondary gating array 60 reverses power at a time 136 on the fall and a time 138 on the rise of the phase-shifted secondary gating trace 120.

When each of the primary gating array 50 and the secondary gating array 60 are in operation, a resulting gating trace 140 reverses at each of the times 122, 124, 136, and 138. Thus, the output of the, primary gating array 50 and the secondary gating array 60 is a power curve that vacillates from a maximum 142 to a minimum 144 determined by the input power. Integrating the resulting gating trace 140 over a single cycle is accomplished by subtracting a negative area 148 of the curve below the zero-voltage axis 112 from a positive area 146. Because 0.5×1 portion of Equation (1) is the same for the positive and negative portions, it cancels out of the equation.

Over one cycle, then, the result is M sin $$\left(\frac{\omega_m n \Delta t}{2\pi}\right).$$

Where M=1, i.e. all of the input power is applied to the output terminals at the windings of the generator 20, the resulting value over one cycle is sin $$\left(\frac{\omega_m n \Delta t}{2\pi}\right).$$

Because this value is the amount of time the input power is applied to the output terminals at the generator 20, it can be said to be the product of the sinusoidal input power curve times sin $$\left(\frac{\omega_m n \Delta t}{2\pi}\right)$$

or the product of sines for each discrete interval $\Delta t$. Thus, by a distinct chopping strategy, the present invention effects the geometric equations taught in the York patent.

Figure 4:
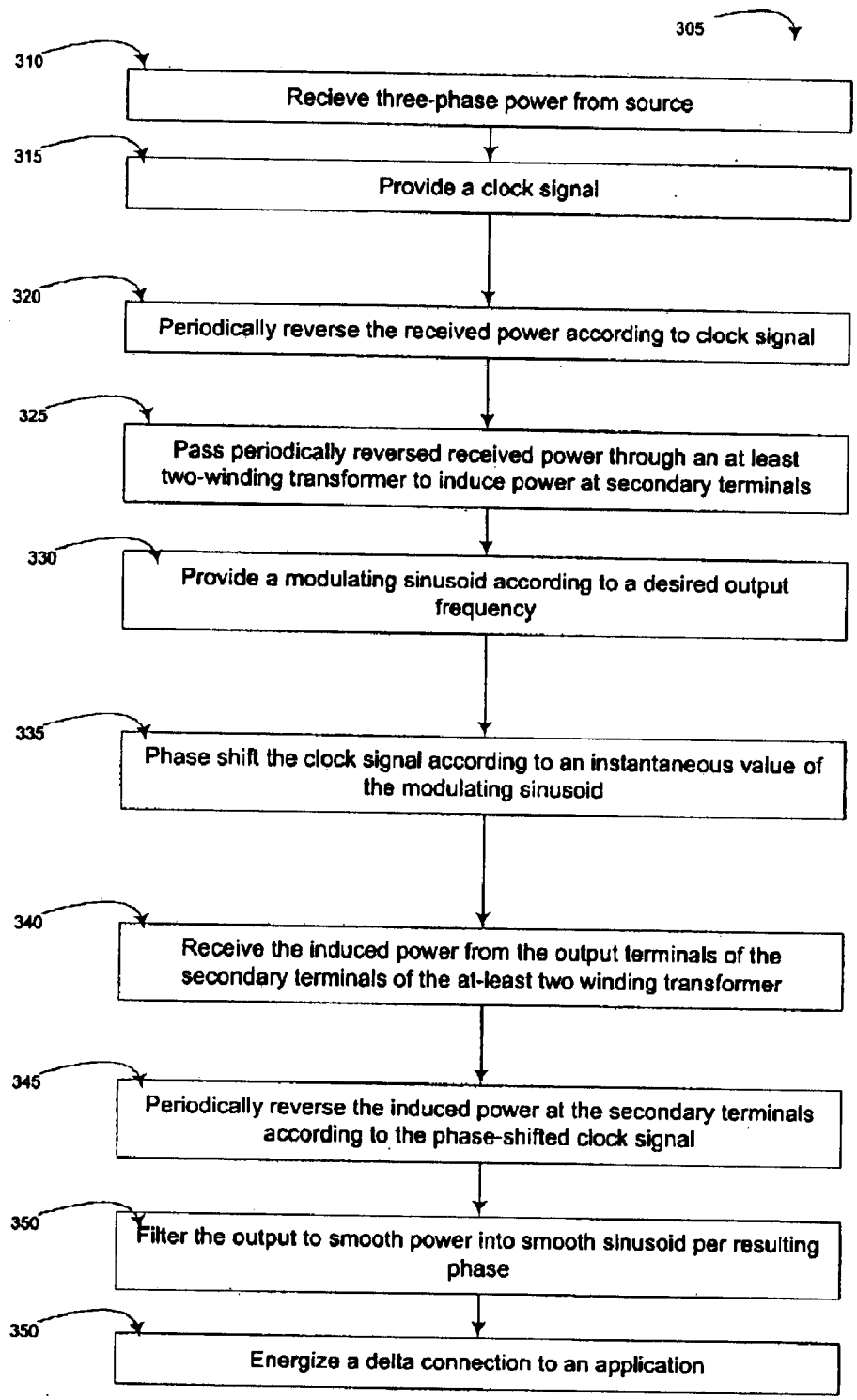
FIG. 4 is a flow-chart of a method of modulating power using the primary and secondary choppers.

Referring to FIG. 4, a presently preferred method 305 modulates power using the primary and secondary choppers. At a block 310, power is received from a power source such as a synchronous generator. There is no requirement that the power have a fixed frequency but, rather, may be of any instantaneous frequency that is convenient to generate according to the prime mover. The generator provides three-phase power at a wye-connected terminal set. Each phase of power suitably is alternating current, i.e. voltage for each phase is sinusoidal having a frequency with an offset from the others by a factor of $$\frac{2\pi}{3}.$$

At a block 315, a clock signal with a frequency that significantly exceeds that of the received power is generated. The clock signal drives a primary chopper and a secondary chopper. While the clock signal is used to effect the multiplication of two sine waves, frequency of the clock signal will not affect the output of the secondary chopper except where frequency of the clock signal approaches frequency of the power received from the generator. It is only necessary that the frequency of the clock signal be significantly higher than that of the input power in order to facilitate the modulation scheme set forth in the discussion of FIG. 3 above.

At a block 320, the received power is periodically-reversed at the primary chopper according to the clock signal. The periodically reversed power approximates a square wave. The approximately square wave is passed through a transformer having primary and secondary terminals at a block 325 to provide isolation between the primary and secondary choppers. Power is input at the primary and output at the secondary terminals.

At a block 330, a modulating wave is generated at a modulating frequency configured to produce an output power at a desired frequency. The modulating wave is generated to determine the instantaneous frequency of the output power. As taught in the York '468 Patent, a frequency selected by sampling the input frequency will determine a desired stable output frequency. Thus, the modulating wave varies as a function of the input frequency if a constant output frequency is desired.

At a block 335, the clock frequency is phase-shifted by a fractional portion of a period of the clock signal according to one half of one wavelength plus the instantaneous value of the modulating wave.

The resulting phase-shifted clock signal is used to time the periodic reversal of the power presented at the secondary terminals of the transformer by means of a secondary chopper at a block 340. Advantageously, the secondary chopper 75 can be defined simply by timing the periodic reversal of polarity, generally tied to the zero crossings of the clock signal. The phase-shifting means appropriately delaying the timing of the reversal signals according to the instantaneous value of the modulating signal. Any means for triggering these signals in accordance with a phase-shifted clock signal, including look-up tables, gating arrays such as those taught in the York '468 patent, or any other means known in the art, will serve to appropriately reverse polarity.

At a block 345, a gating array periodically reverses the power received at the secondary terminals of the at least two-winding transformer. At a block 350, the chopped power is filtered with a low-pass filter to remove higher order harmonics that would, if allowed to reach the motor, only heat the iron cores of the windings rather than turn the shaft of the motor. Once suitably filtered, at a block 355, the power is applied to an application in delta connection.

In order to exploit the variability of the output power, at a block 360, the controller is configured to measure the frequency of the output waveform and to modify the modulating sinusoid to produce the desired frequency in one presently preferred embodiment.

While the preferred embodiment of the invention has been illustrated and described, as noted above, many changes can be made without departing from the spirit and scope of the invention. The output described above is a three-phase output. Accordingly, the scope of the invention is not limited by the disclosure of the preferred embodiment. Instead, the invention should be determined entirely by reference to the claims that follow.

What is claimed is:

1. A direct conversion programmable power controller receiving polyphase input power at an input power frequency and having a polarity, the controller, for each phase of power, comprising:

a primary chopper for reversing each phase of electrical power according to a first reference signal having a reference frequency that is substantially higher than frequency of the electrical power, each primary chopper having a power input, a signal input, and an output, the power input being electrically connected in wye-connection to each phase of power;

a transformer for each phase of power, each transformer having primary and secondary terminals and being electrically connected by its primary terminals to the output of the primary chopper; and a secondary chopper for each phase of power, the secondary chopper having an input electrically connected to the secondary terminals of the transformer and an output electrically connected to a load, the secondary chopper being configured to phase-shift the first reference signal according to a second reference signal and to reverse each phase of electrical power according to the phase-shifted reference signal.

2. The controller of claim 1, further comprising:
a processor; and
a first sensor for sensing at least one phase of power, the first sensor being configured to measure the input power frequency.

3. The controller of claim 2, wherein the processor generates the second reference signal according to the measured input power frequency and a desired output frequency.

4. The controller of claim 3, wherein the second reference signal has a frequency equal to a sum of the frequency of the power input frequency and the desired output frequency.

5. The controller of claim 4, wherein a feedback system generates the second reference signal according to the power input frequency and a reference sinusoid.

6. The controller of claim 1, wherein the desired output frequency is substantially zero, such that direct current is provided to the load.

7. The controller of claim 1, wherein the load is electrically connected to the output in three-phase power in a delta connection.

8. The controller of claim 1, wherein the output of each phase is electrically connected to the remaining phases in series such that single-phase power is presented to the load.

9. The controller of claim 1, wherein the output of the primary chopper is electrically connected to the input terminals of the transformer by a power bus.

10. The controller of claim 9, wherein a plurality of transformers are electrically connected to the output terminals of the primary chopper, each of the plurality of transformers being electrically connected at its output terminals to one of a plurality of secondary choppers, the secondary choppers phase-shifting the first reference signal according to one of a plurality of second reference signals and being electrically connected to one of a plurality of loads.

11. The controller of claim 1, wherein the output of the transformer is connected to the input terminals of the secondary chopper by a power bus.

12. The controller of claim 11, wherein a plurality of secondary choppers are electrically connected to the output terminals of the transformer, the secondary choppers phase-shift the first reference signal according to one of a plurality of second reference signals and being electrically connected to one of a plurality of loads.

13. The controller of claim 11, wherein the transformer has a plurality of secondary windings, the output terminals of each secondary winding being electrically connected to one of a plurality of secondary choppers, the secondary choppers phase-shift the first reference signal according to one of a plurality of second reference signals, and being electrically connected to one of a plurality of loads.

14. The controller of claim 1, further comprising an input low-pass, power conditioning filter including:
an inductive element electrically connected in series between a source of the polyphase input power and the input of the primary chopper; and
a capacitive element electrically connected to the input of the primary chopper in parallel with the source of polyphase input power.

15. The controller of claim 1, further comprising an output low-pass, power conditioning filter including:
an inductive element electrically connected in series between the load and the output of the secondary chopper; and
a capacitive element electrically connected to the output of the secondary chopper in parallel with the load.

16. A method for controlling three-phase electrical power, the power having a polarity and power frequency, the method comprising:
providing three-phase electrical power from a wye-connected power source, each phase of electrical power being offset from the other phases of electrical power by phase angles of $2\pi/3$ radians;
reversing the polarity of each phase of electrical power at a first frequency;
applying the reversing polarity electrical power through an at least two-winding transformer having a set of primary terminals and a set of secondary terminals for each phase of electrical power, the primary terminals being configured to receive the reversing polarity electrical power, the secondary terminals being configured to induce an electrical power having a voltage and a current;
generating a phase-angle-modulated first signal at the first frequency to correspond with each phase of the three-phase power;
reversing the polarity of each phase of the induced electrical power according to the generated phase-angle-modulated first signal; and
applying the induced electrical power to a load.

17. The method of claim 16, wherein providing three-phase electrical power includes filtering the three-phase electrical power to remove ripple.

18. The method of claim 16, wherein applying the induced electrical power includes integrating the induced electrical power.

19. The method of claim 16, wherein phase-angle modulation is based upon a predetermined value for a frequency of the induced electrical power applied to the load.

20. The method of claim 16, wherein applying the induced electrical power to a load includes applying three-phase power to a load in delta connection.

21. The method of claim 16, wherein applying the induced electrical power to a load includes applying three-phase power to a load in series connection such that single-phase electrical power is applied to the load.

22. The method of claim 16, wherein the induced electrical power is applied to the load at a frequency of substantially zero, such that direct current is applied to the load.

23. The method of claim 16, wherein generating a phase angle modulated first signal further includes scaling the second signal to regulate amplitude of the three-phase electrical power applied to the load.

24. The method of claim 16, wherein applying the reversing polarity electrical power includes providing reversing polarity electrical power to a power bus and receiving reversing polarity electrical power from the power bus, and applying the reversing polarity electrical power received from the power bus to the at least two-winding transformer.

25. The method of claim 24, wherein the at least two-winding transformer includes a plurality of two-winding transformers and wherein the load is a plurality of loads.

26. The method of claim 16, wherein the induced electrical power is applied to a plurality of loads.

27. The method of claim 26, wherein a plurality of phase-angle-modulated first signals is generated, each first signal being generated according to one of the plurality of loads.

28. A universal mode power controller, the controller comprising:

a primary clock configured to generate a clock signal;

a secondary clock configured to phase-shift the clock signal to generate a phase-shifted clock signal;

a primary gating array, the primary gating array having primary input terminals and primary output terminals and configured to periodically reverse power received at the primary input terminals and presented at the primary output terminals according to the clock signal;

a transformer having at least two windings and having primary transformer terminals and secondary transformer terminals, the primary transformer terminals being electrically connected to the primary output terminals; and a secondary gating array, the secondary gating array having secondary input terminals and secondary output terminals and configured to periodically reverse power received at the secondary input terminals and presented at the secondary output terminals according to the phase-shifted clock signal, the secondary input terminals being electrically connected to the secondary transformer terminals.

29. The controller of claim 22, wherein, the secondary clock phase-shifts the clock signal according to a modulating sinusoid.

30. The controller of claim 23, wherein the modulating sinusoid is configured to produce power presented at the secondary output terminals having a predetermined frequency.

31. The controller of claim 24, wherein the predetermined frequency is selected to optimize an output frequency.

32. The controller of claim 25, wherein the desired frequency is around zero.

* * * * *